United States Patent
Zhang et al.

(10) Patent No.: US 9,351,076 B2
(45) Date of Patent: May 24, 2016

(54) AUDIO AND VIDEO SIGNAL TRANSMISSION INTERFACE APPARATUS AND METHOD THEREOF

(71) Applicant: HUAWEI DEVICE CO., LTD., Shenzhen (CN)

(72) Inventors: Xiangdang Zhang, Shenzhen (CN); Zufeng Guo, Chengdu (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 442 days.

(21) Appl. No.: 14/020,050

(22) Filed: Sep. 6, 2013

(65) Prior Publication Data

US 2014/0010390 A1  Jan. 9, 2014

Related U.S. Application Data

(63) Continuation of application No. PCT/CN2012/071324, filed on Feb. 20, 2012.

(30) Foreign Application Priority Data

Mar. 8, 2011 (CN) .......................... 2011 1 0059165

(51) Int. Cl.
*H04H 20/48* (2008.01)
*H04R 5/04* (2006.01)
(Continued)

(52) U.S. Cl.
CPC ................ *H04R 5/04* (2013.01); *H04N 5/765* (2013.01); *H04N 21/43632* (2013.01)

(58) Field of Classification Search
CPC combination set(s) only.
See application file for complete search history.

(56) References Cited

U.S. PATENT DOCUMENTS 6,069,960 A * 5/2000 Mizukami ................ H04R 5/04
                                                          381/120
2004/0081099 A1  4/2004 Patterson et al.
(Continued)

FOREIGN PATENT DOCUMENTS

CN       101030189       9/2007
CN       200983638       11/2007
(Continued)

OTHER PUBLICATIONS

Extended European Search Report dated Jan. 12, 2015 in corresponding European Patent Application No. 12754505.1.
(Continued)

*Primary Examiner* — Duc Nguyen
*Assistant Examiner* — Assad Mohammed
(74) *Attorney, Agent, or Firm* — Staas & Halsep LLP

(57) ABSTRACT

An audio and video signal transmission interface apparatus includes a left sound channel interface, a right sound channel interface, a multimedia terminal interface, and a ground interface; where a first power supply and a first resistor are connected in series in the multimedia terminal interface; and the apparatus further includes a voltage detecting module, a determining module, a control module, and a second resistor connected in series in the multimedia terminal interface, where a resistance value of the second resistor is greater than an internal resistance value of an audio and video terminal and smaller than an internal resistance value of a microphone terminal in reverse connection; the determining module identifies different types of transmission lines by using a voltage value measured by the voltage detecting module; and the control module is configured to implement adaptation of different transmission lines.

13 Claims, 19 Drawing Sheets

(51) Int. Cl.
*H04N 5/765* (2006.01)
*H04N 21/4363* (2011.01)

(56) References Cited

U.S. PATENT DOCUMENTS

| | | | |
|---|---|---|---|
| 2005/0142916 A1* | 6/2005 | Larn | G11B 20/10527 439/188 |
| 2007/0164861 A1 | 7/2007 | Sano | |
| 2008/0010406 A1 | 1/2008 | Kang et al. | |
| 2011/0093643 A1* | 4/2011 | Hung | G06F 13/409 710/316 |
| 2011/0103608 A1* | 5/2011 | Wu | H04M 1/6058 381/74 |

FOREIGN PATENT DOCUMENTS

| | | |
|---|---|---|
| CN | 101089837 | 12/2007 |
| CN | 101163220 | 4/2008 |
| CN | 101394526 | 3/2009 |
| CN | 101466008 | 6/2009 |
| CN | 102164263 | 8/2011 |
| EP | 2224748 A1 | 9/2010 |
| JP | 10-79997 | 3/1998 |
| JP | 2000-32339 | 1/2000 |
| JP | 2005-531227 | 10/2005 |
| JP | 2005-347865 | 12/2005 |
| JP | 2007-180742 | 7/2007 |
| JP | 2008-182525 | 8/2008 |
| JP | 2008-301068 | 12/2008 |
| JP | 2010-278691 | 12/2010 |
| JP | 2011-217228 | 10/2011 |

OTHER PUBLICATIONS

International Search Report and Written Opinion, dated May 31, 2012, in corresponding International Application No. PCT/CN2012/071324 (13 pp.).

International Search Report mailed May 31, 2012 in corresponding International Application No. PCT/CN2012/071324.

Japanese Notice of Allowance dated Feb. 3, 2015 in corresponding Japanese Patent Application No. 2013-556951.

* cited by examiner

AUDIO AND VIDEO SIGNAL TRANSMISSION INTERFACE APPARATUS AND METHOD THEREOF

CROSS-REFERENCE TO RELATED APPLICATIONS

This application is a continuation of International Application No. PCT/CN2012/071324, filed on Feb. 20, 2012, which claims priority to Chinese Patent Application No. 201110059165.2, filed on Mar. 8, 2011, both of which are hereby incorporated by reference in its entireties.

FIELD OF THE INVENTION

Embodiments of the present invention relate to the field of audio technologies, and in particular, to an audio and video signal transmission interface apparatus and a method thereof.

BACKGROUND OF THE INVENTION

An audio and video signal transmission line is used to transmit an audio signal or an audio and video signal output by a device such as a computer and a smart mobile terminal to a user or another device. The audio and video signal transmission line includes an earphone with wires and an audio and video data line. The earphone with wires is classified into an LRG earphone, an LRMG earphone, and an LRGM earphone according to different line sequences. The LRG earphone includes two sound channels, a left one and a right one; the LRMG earphone and the LRGM earphone both include left and right sound channels and a microphone.

During the implementation of the present invention, the inventors have found that the prior art has at least the following problem:

At present, a device connected to an audio and video signal transmission line supports only an audio and video signal transmission line that matches the line sequence of the interface of the device, which cannot achieve compatibility between different types of devices and audio and video signal transmission lines.

SUMMARY OF THE INVENTION

Embodiments of the present invention provide an audio and video signal transmission interface apparatus and method, thereby solving the compatibility problem between different types of devices and an audio and video signal transmission line.

The objective of the present invention is achieved by using the following technical solutions.

An audio and video signal transmission interface apparatus includes a left sound channel interface, a right sound channel interface, a multimedia terminal interface, and a ground interface. A voltage detection point is set in a circuit of the multimedia terminal interface; where a first power supply is connected to the voltage detection point through a first resistor. The apparatus further includes a voltage detecting module, a determining module, a control module, and a second resistor with one end connected to the voltage detection point and the other connected to a power supply.

The voltage detecting module is configured to detect a voltage value at the voltage detection point of a multimedia terminal of an audio and video signal transmission line that is inserted, where the multimedia terminal of the audio and video signal transmission line includes an audio and video terminal or a microphone terminal, and a resistance value of the second resistor is greater than an internal resistance value of the audio and video terminal and is smaller than an internal resistance value of the microphone terminal in reverse connection.

The determining module is configured to determine a type of the audio and video signal transmission line according to a detecting result of the voltage detecting module.

The control module is configured to perform processing according to a determination result of the determining module.

A method for processing, by an interface apparatus above, an inserted audio and video signal transmission line, includes:

after an audio and video signal transmission line is inserted into the interface apparatus, measuring, by the voltage detecting module, when the first resistor is on and the second resistor is off, a first voltage value of a multimedia terminal in the audio and video signal transmission line;

determining, by the determining module, whether the first voltage value is greater than a first threshold or smaller than a third threshold; if the first voltage value is greater than the first threshold or smaller than the third threshold, determining that the audio and video signal transmission line is an earphone matching an interface line sequence of the apparatus; otherwise, triggering the control module to operate, where the first threshold is greater than the third threshold;

switching off, by the control module, the first resistor; switching on the second resistor; and triggering the voltage detecting module to re-measure a voltage; where the voltage detecting module also measures a second voltage value of the multimedia terminal in the audio and video signal transmission line upon being triggered by the control module;

further comparing, by the determining module, the second voltage value with a second threshold; if the second voltage value is smaller than or equal to the second threshold, determining that the audio and video signal transmission line is an audio and video data line; otherwise, determining that the audio and video signal transmission line is an earphone that does not match the interface sequence of the apparatus; and sending a determination result to the control module, where the second threshold is smaller than the first threshold and greater than the third threshold;

if the audio and video signal transmission line is the audio and video data line, the second resistor, further switching off, by the control module, switching on the first resistor, and reporting a message about that the audio and video data line is inserted; and if the audio and video signal transmission line is the earphone that does not match the interface line sequence of the apparatus, further switching off, by the control module the second resistor, switching on the first resistor, and switching a line sequence of the multimedia terminal interface and the ground interface.

Based on the technical solutions provided in embodiments of the present invention, in the embodiments of the present invention, because a second resistor having a resistance value between a resistance value of an audio and video terminal and a resistance value of a microphone terminal in reverse connection is added on a device side, a three-pole earphone (such as LRG (left sound channel—right sound channel—grounding line) earphone), an LRMG (left sound channel—right sound channel—microphone—grounding line) line-sequence earphone, an LRGM (left sound channel—right sound channel—grounding line—microphone) line-sequence earphone, and an audio and video data line may be accurately identified, and adaptation is implemented for different earphones, thereby implementing compatibility between a device and different types of audio and video signal transmission lines.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and persons of ordinary skill in the art may still derive other drawings from these accompanying drawing without creative efforts.

DETAILED DESCRIPTION OF THE EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments derived by persons of ordinary skill in the art based on the embodiments of the present invention without creative efforts shall fall within the protection scope of the present invention.

Figure 1:
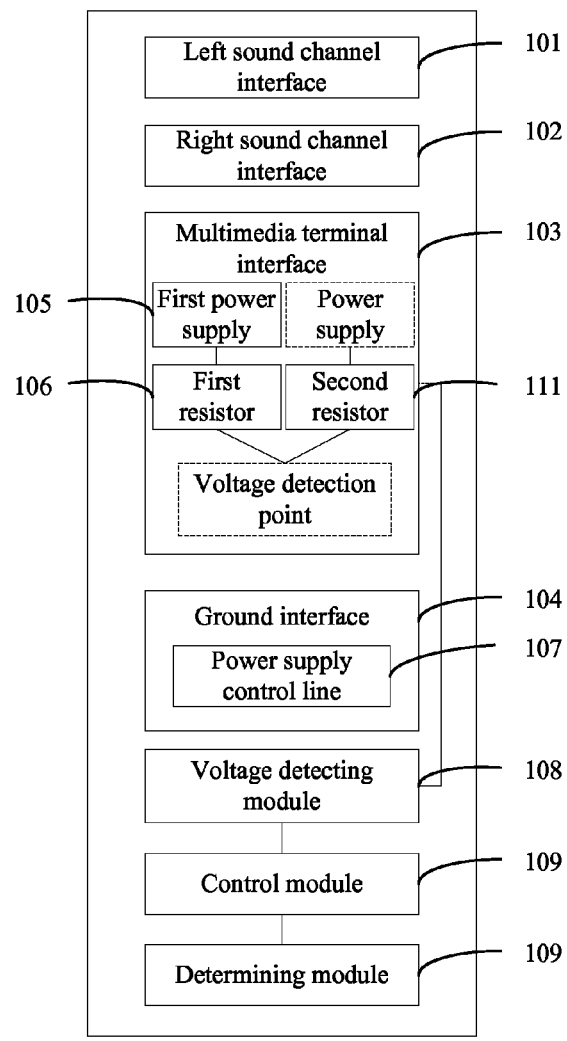
FIG. 1 is a schematic structural diagram of an interface apparatus according to an embodiment of the present invention.

Embodiments of the present invention provide an audio and video signal transmission interface apparatus. As shown in FIG. 1, the apparatus includes a left sound channel interface 101, a right sound channel interface 102, a multimedia terminal interface 103, and a ground interface 104, where a voltage detection point is set in a circuit of the multimedia terminal interface 103, and a first power supply 105 is connected to the voltage detection point through a first resistor 106. In the prior art, a line sequence of the interface apparatus generally is left sound channel interface—right sound channel interface—multimedia terminal interface—ground interface, or left sound channel interface—right sound channel interface—ground interface—multimedia terminal interface. In the embodiments of the present invention, the interface apparatus is exemplified by using the above two line sequences. However, it should be noted that the line sequence of the interface apparatus provided in the embodiments of the present invention is not limited to the above two implementation modes. Because the operating principles are similar, in the embodiments of the present invention, an interface apparatus of other line sequence types are not described in detail.

In order to implement compatibility between a device and different types of audio and video signal transmission lines, the interface apparatus provided in the embodiments of the present invention further includes a voltage detecting module 108, a determining module 109, a control module 110, and a second resistor 111 of which one end is connected to the voltage detection point and of which the other end is connected to a power supply. The voltage detecting module 108 is configured to detect a voltage value at the voltage detection point of a multimedia terminal of an audio and video signal transmission line that is inserted; the determining module 109 is configured to determine a type of the audio and video signal transmission line according to a detecting result of the voltage detecting module 108; and the control module 110 is configured to perform processing according to a determination result of the determining module 109, where a processing operation includes but is not limited to controlling a line sequence between the multimedia terminal interface and the ground interface. The multimedia terminal of the audio and video signal transmission line includes an audio and video terminal or a microphone terminal, where the audio and video terminal is a multimedia terminal in an audio and video data line, and the microphone terminal is a microphone terminal in an earphone. In order to ensure that different types of audio and video signal transmission lines can be identified according to a detected voltage value, a resistance value of the second resistor 111 needs to be greater than an internal resistance value of the audio and video terminal, and smaller than an internal resistance value of the microphone terminal in reverse connection.

The interface apparatus provided in the embodiments of the present invention is set on a device side, which may specifically be an interface of the device side or be connected, as an independent apparatus, to an interface of the device side.

The determining module 109 and the control module 110 may specifically be implemented by a CPU.

In the embodiments of the present invention, the audio and video signal transmission line includes a three-pole earphone, an LRMG line-sequence earphone, an LRGM line-sequence earphone, and an audio and video data line (whose line sequence is LRVG, where V is an audio and video terminal). Generally, a resistance value of the first resistor ranges from 1500 to 3000 ohms; the multimedia terminal in the LRMG line-sequence earphone and the LRGM line-sequence earphone is a microphone terminal, and when the microphone terminal is in normal connection, an internal resistance value ranges from 2000 to 3500 ohms, where the internal resistance value of the microphone terminal in normal connection is two to three times of that in reverse connection; and the multimedia terminal in the audio and video data line is an audio and video terminal, and a resistance value of the audio and video terminal is about 75 ohms.

After the audio and video signal transmission line is inserted into the interface apparatus, if the first power supply is used to supply power and the first resistor is used to divide a voltage, in a loop of a first power supply—first resistor—multimedia terminal of transmission line side—ground interface: (1) because there is no much difference between a resistance value of the microphone terminal in normal connection of the LRMG line-sequence earphone and the LRGM line-sequence earphone and the resistance value of the first resistor, there is no much difference between a component voltage on an earphone side and a component voltage of the first resistor when the microphone terminal of the LRMG line-sequence earphone and the LRGM line-sequence earphone is in normal connection; (2) because the three-pole earphone does not include a multimedia terminal, the component voltage on the earphone side is almost zero after the three-pole earphone is inserted into the apparatus; and (3) because the resistance value of the microphone terminal in reverse connection of the LRMG line-sequence earphone and the LRGM line-sequence earphone, and a resistance value of the audio and video terminal of the audio and video data line are much smaller than the resistance value of the first resistor, a component voltage value is also lower than that of the first resistor, and in the loop of dividing the voltage by the first resistor, the LRMG line-sequence earphone and the LRGM line-sequence earphone whose the microphone terminals are in reverse connection, and the audio and video data line cannot be distinguished.

In such cases, voltage division may be performed by the second resistor. In a loop of a power supply connected to the second resistor—second resistor—microphone terminal of transmission line side—ground interface, a voltage value on the audio and video signal transmission line side is measured. The resistance value of the microphone terminal in reverse connection of the LRMG line-sequence earphone (or the LRGM line-sequence earphone) is greater than the resistance value of the audio and video terminal in the audio and video data line. Therefore, a resistance value of the second resistor may be set to be greater than the resistance value of the audio and video terminal and smaller than the resistance value of the microphone terminal in reverse connection, so as to distinguish the LRMG line-sequence earphone (or the LRGM line-sequence earphone) whose microphone terminal is in reverse connection or the audio and video data line in the loop by using the second resistor to perform voltage division. For exemplary purpose rather than a limitation, the resistance value of the second resistor 111 ranges from 150 to 350 ohms Based on the value ranges of the above resistance values and the analysis of voltage division relationships, in a loop having the first resistor for voltage division, when the microphone terminal of the LRMG line-sequence earphone (or the LRGM line-sequence earphone) is in normal connection, a component voltage value on the earphone side is greater than the component voltage value of a transmission line of other types. Therefore, according to the above resistance value characteristics and the power-supplying capacity of the first power supply, a first threshold is set, so as to determine whether an LRMG line-sequence earphone (or an LRGM line-sequence earphone) having a microphone terminal in normal connection is inserted according to the first threshold. According to the above characteristics of the three-pole earphone, a third threshold (for exemplary purpose rather than a limitation, a value range of the third threshold is smaller than 0.3 V) is set for identifying a three-pole earphone. In a loop having the second resistor for voltage division, because the resistance value of the second resistor is smaller than the resistance value of the microphone terminal in reverse connection of the LRMG line-sequence earphone (or the LRGM line-sequence earphone) and greater than the resistance value of the audio and video terminal of the audio and video data line, a second threshold may be set according to the power-supplying capacity of a power supply connected to the second resistor and the above resistance value characteristics, so that the second threshold is smaller than the component voltage on the earphone side when the microphone terminal of the LRMG line-sequence earphone (or the LRGM line-sequence earphone) is in reverse connection, and greater than the component voltage of the audio and video terminal of the audio and video data line, so as to distinguish an LRMG line-sequence earphone (or an LRGM line-sequence earphone) having a microphone terminal in reverse connection or an audio and video data line.

The procedure of identifying an audio and video signal transmission line and processing the problem of audio and video signal transmission line compatibility by the interface apparatus provided in the embodiments of the present invention according to the thresholds set above is as follows:

After the audio and video signal transmission line is inserted into the interface apparatus, the voltage detecting module 108 measures, when the first resistor 106 is on and the second resistor 111 is off, a first voltage value of a multimedia terminal in the inserted audio and video signal transmission line; the determining module 109 determines whether the first voltage value is greater than the first threshold or smaller than the third threshold, and if the first voltage value is greater than the first threshold or smaller than the third threshold, the determining module determines that the audio and video signal transmission line is an earphone matching an interface line sequence of the interface apparatus (the earphone matching the interface line sequence of interface apparatus refers to an LRMG earphone or an LRGM earphone having a microphone terminal in normal connection, or a three-pole earphone); otherwise, the determining module triggers the control module 110 to operate (for exemplary purpose rather than a limitation, the determining module 109 may send an unidentifiable signal to the control module 110, and trigger the control module 110 to operate by using the signal; and the control module 110, after receiving the unidentifiable signal, switches off the loop having the first resistor for voltage division and switches on a loop having the second resistor for voltage division). Correspondingly, the control module 110 switches off the first resistor 106, switches on the second resistor 111, and triggers the voltage detecting module 108 to re-measure the voltage. Correspondingly, the voltage detecting module 108 also measures, as triggered by the control module 110, a second voltage value of the multimedia terminal in the audio and video signal transmission line. The determining module 109 also compares the second voltage value with the second threshold; if the second voltage value is smaller than or equal to the second threshold, the determining module determines that the audio and video signal transmission line is an audio and video data line; otherwise, the determining module determines that the audio and video signal transmission line is an earphone that does not match the line sequence of the interface apparatus (the earphone that does not match the line sequence of the interface apparatus refers to an LRMG earphone or an LRGM earphone having a microphone terminal in reverse connection), and sends a determination result to the control module 110 (for exemplary purpose rather than a limitation, the control module 110 may identify a corresponding transmission line type according to the determination result, and then perform corresponding actions);

if the audio and video signal transmission line is the audio and video data line, the control module 110 further switches off the second resistor 111, switches on the first resistor 106, and reports a message about that the audio and video data line is inserted; and if the audio and video signal transmission line is the earphone that does not match the line sequence of the interface apparatus, the control module 110 further switches off the second resistor 111, switches on the first resistor 106, and switches a line sequence of the multimedia terminal interface 103 and the ground interface 104. A specific implementation mode of switching the line sequence of the multimedia terminal interface 103 and the ground interface 104 may be controlling an analog switch provided between the multimedia terminal interface and the ground interface to switch the line sequence of the multimedia terminal interface and the ground interface. Correspondingly, an analog switch controlled by a power supply control line is further included between the multimedia terminal interface 103 and the ground interface 104 of the interface apparatus. The control module 110 controls the analog switch by switching an output level of the power supply control line, thereby switching the line sequence between the multimedia terminal interface and the ground interface. For example, (1) when the power supply control line outputs a high level, the analog switch is switched off, and the line sequence between the multimedia terminal interface 103 and the ground interface 104 remain unchanged; or (2) when the power supply control line outputs a high level, the analog switches is switched on, and the line sequence between the multimedia terminal interface 103 and the ground interface 104 is switched. In the embodiments of the present invention, the analog switch control mode in (1) is described as an example.

By using the above procedure, the interface apparatus provided in the embodiments of the present invention is capable of identifying different types of audio and video data transmission lines that are inserted, and implements compatibility between a device and different types of the audio and video data transmission lines.

In the interface apparatus provided in the embodiments of the present invention, the added second resistor 111 may be connected in parallel to the first resistor 106 and be powered by the first power supply 105. That is, the power supply connected to the second resistor 111 is the first power supply 105.

For issues such as reducing noise increasing due to a circuit change, a preferential implementation mode provided in the embodiments of the present invention is that, a second power supply 112 that is connected to the second resistor 111 is added; the second resistor 111 is switched off by switching off the second power supply 112; the second resistor 111 is switched on by switching on the second power supply 112; the first resistor 106 is switched off by switching off the first power supply 105; and the first resistor 106 is switched on by switching on the first power supply 105. Because the second power supply 112 is added, the existing interface circuit suffers little impact, which is a relatively stable implementation mode with little risk.

Specific implementation modes of the embodiments of the present invention in actual applications are described in detail as follows.

Embodiment 1

Figure 2:
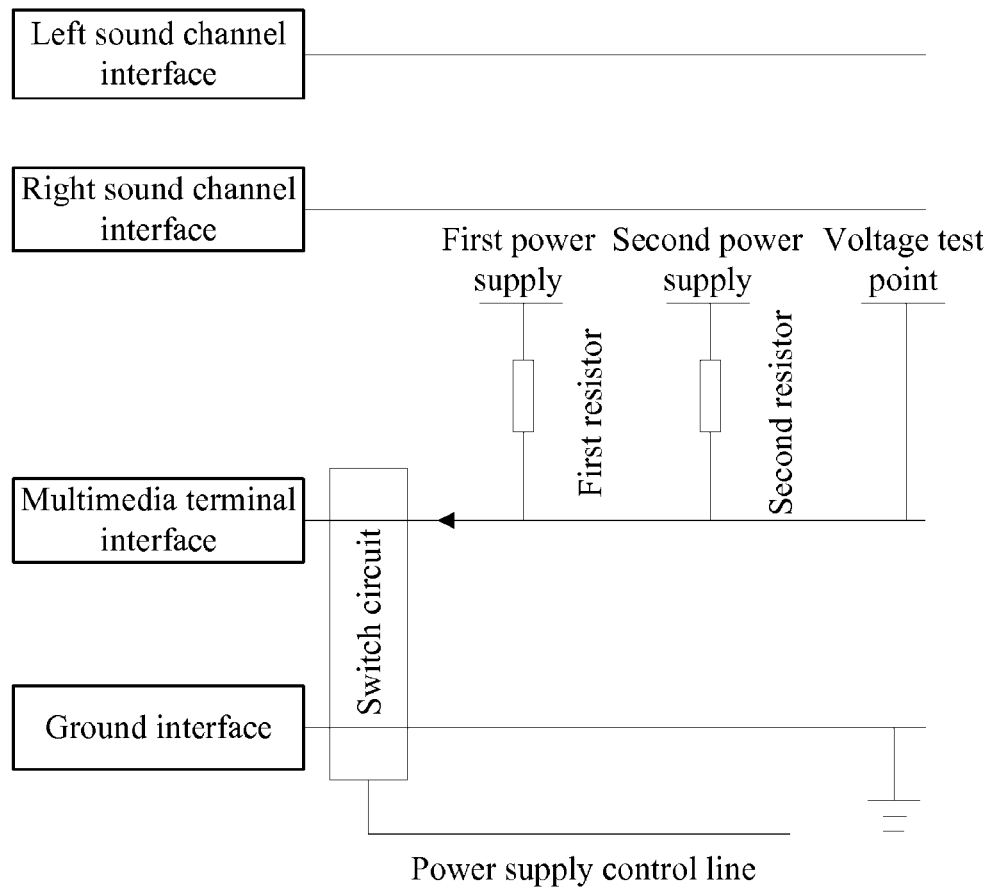
FIG. 2 is a schematic circuit diagram of an interface apparatus according to Embodiment 1 of the present invention.

In embodiment 1, as shown by the schematic circuit diagram of an audio and video signal transmission interface apparatus in FIG. 2, a line sequence of the interface apparatus is left sound channel interface-right sound channel interface-multimedia terminal interface-ground interface. A second power supply and a second resistor are provided at a voltage detection point on a circuit of the multimedia terminal interface. By default, the second power supply is off, the first power supply is on, and a power supply control line outputs a high level.

Figure 3:
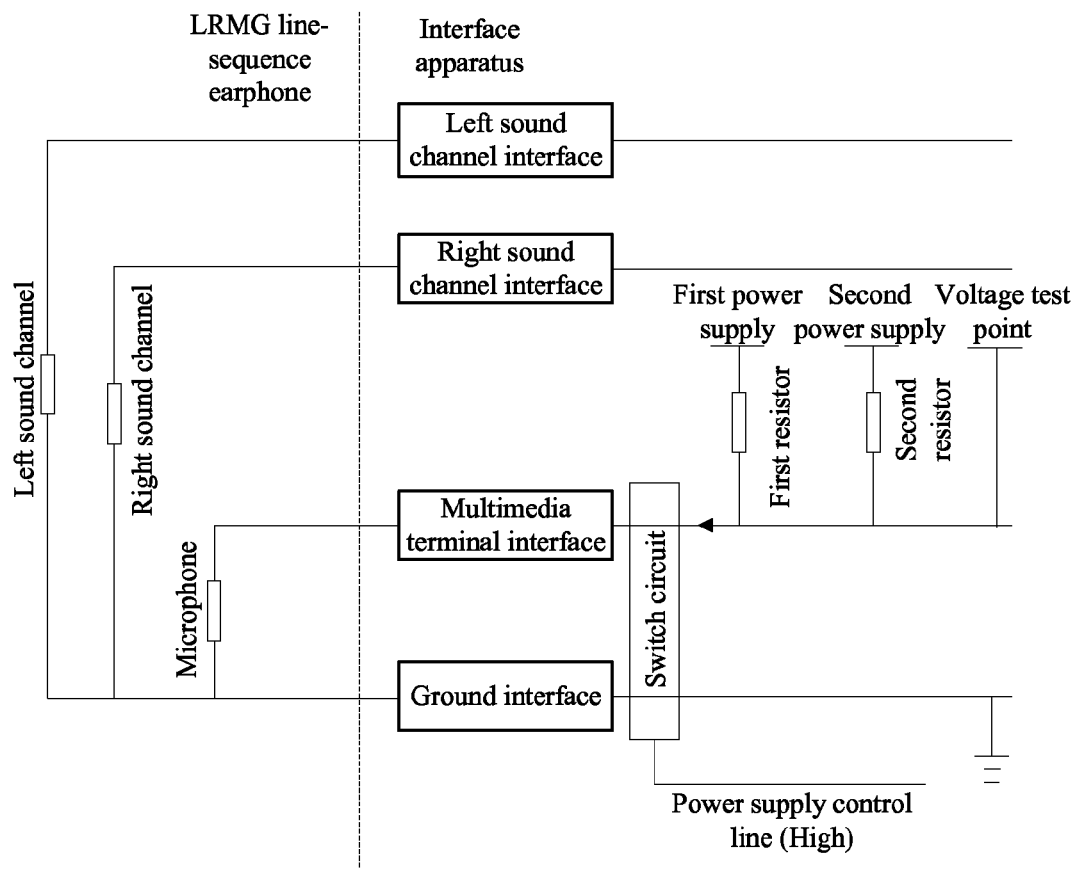
FIG. 3 is a schematic circuit diagram of an LRMG line-sequence earphone inserted into an interface apparatus according to Embodiment 1 of the present invention.
Figure 4:
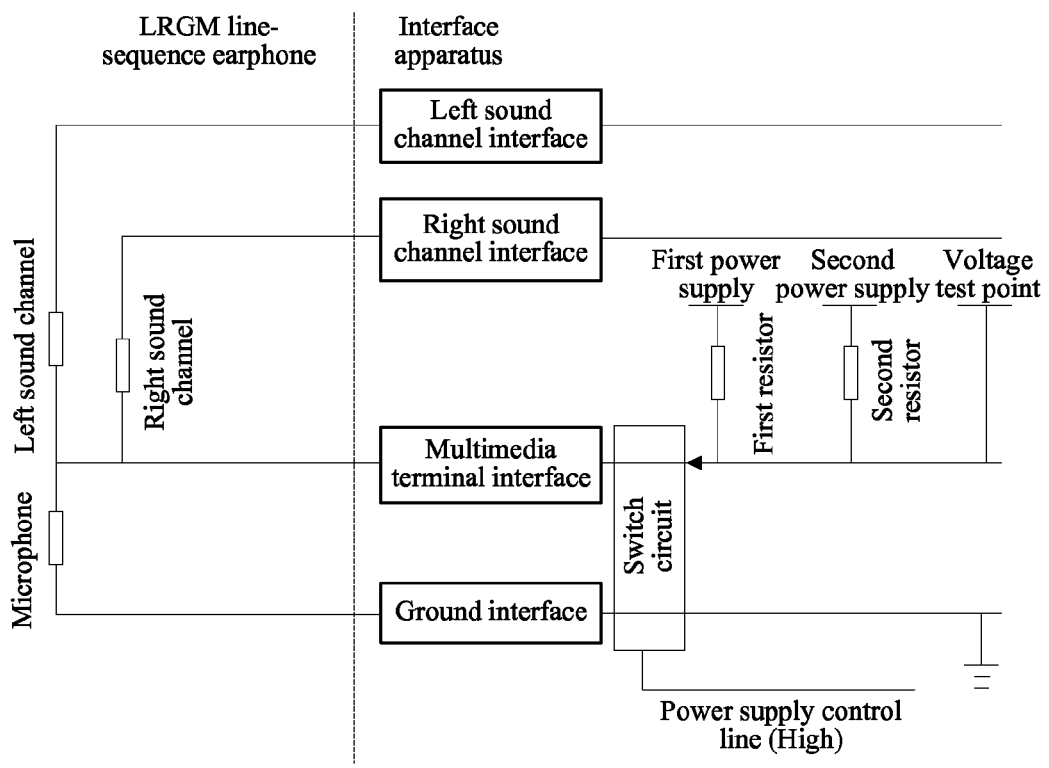
FIG. 4 is a schematic circuit diagram of an LRGM line-sequence earphone inserted into an interface apparatus according to Embodiment 1 of the present invention.
Figure 5:
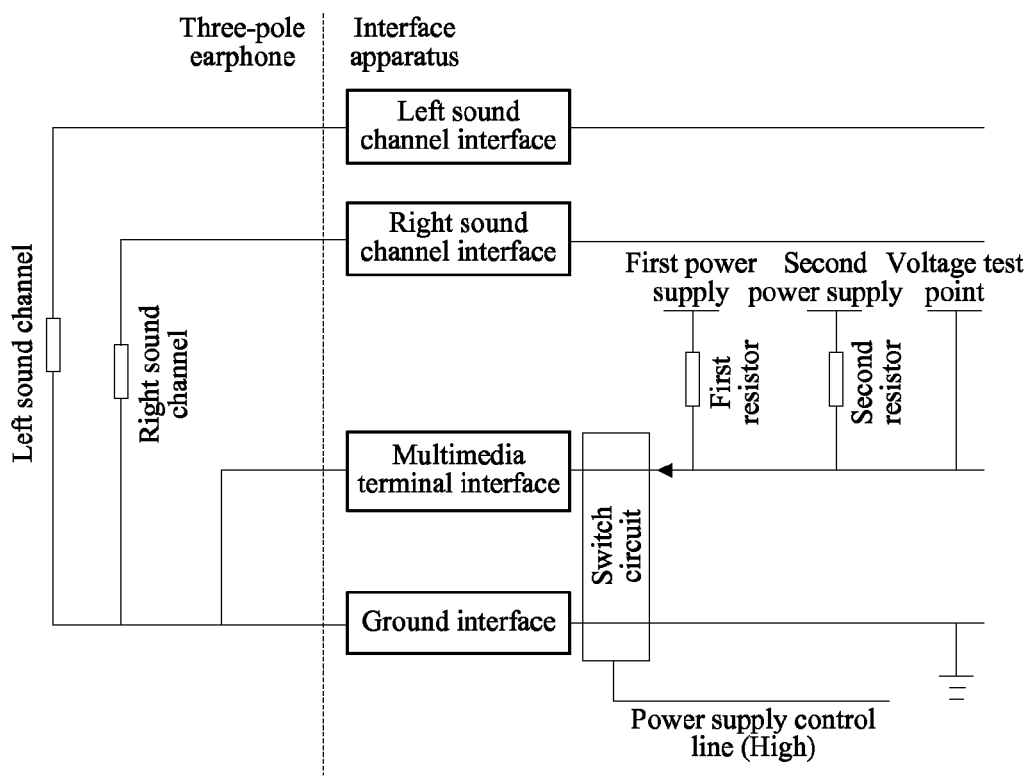
FIG. 5 is a schematic circuit diagram of a three-pole earphone inserted into an interface apparatus according to Embodiment 1 of the present invention.
Figure 6:
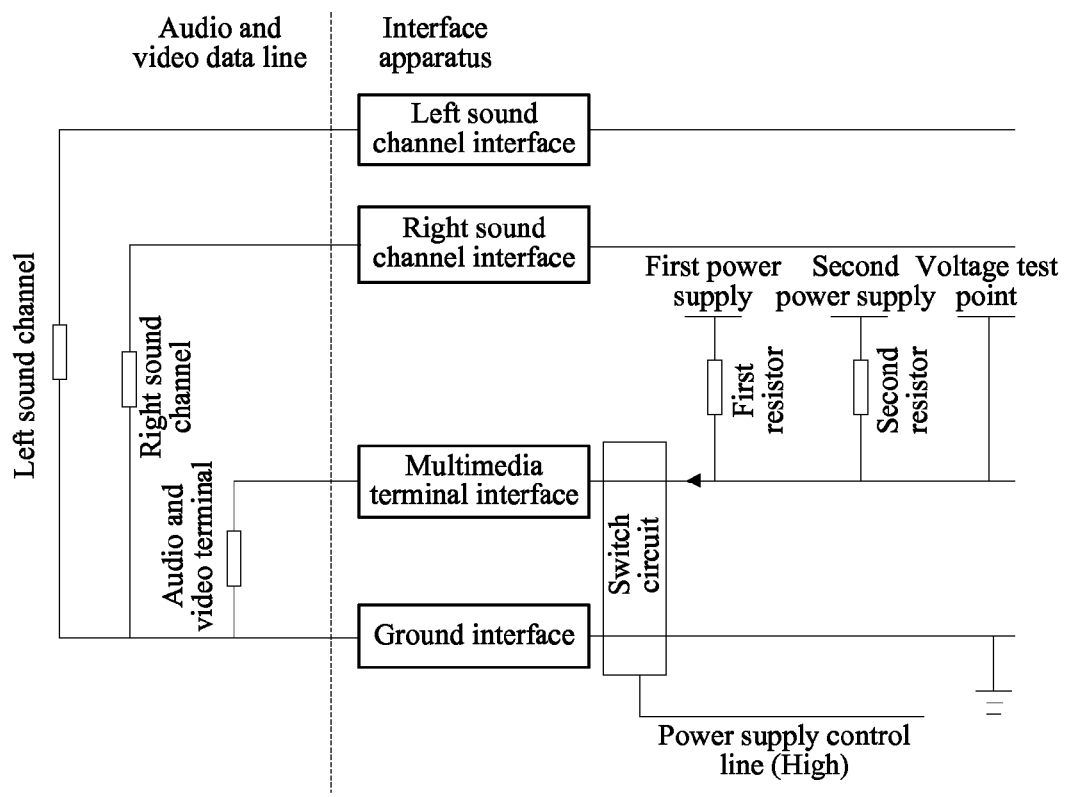
FIG. 6 is a schematic circuit diagram of an audio and video data line inserted into an interface apparatus according to Embodiment 1 of the present invention.

After an audio and video signal transmission line is inserted into the interface apparatus, a voltage value on the transmission line side is detected by using a voltage detection point (a position thereof is shown in FIG. 2) provided on the circuit of the multimedia terminal interface, thereby identifying different types of transmission lines and making them compatible. Schematic circuit diagrams of different types of audio and video data transmission lines inserted into the interface apparatus are shown in FIGS. 3 to FIG. 6. FIG. 3 is a schematic circuit diagram of an LRMG line-sequence earphone inserted into the interface apparatus. FIG. 4 is a schematic circuit diagram of an LRGM line-sequence earphone inserted into the interface apparatus. FIG. 5 is a schematic circuit diagram of a three-pole earphone inserted into the interface apparatus. FIG. 6 is a schematic circuit diagram of an audio and video data line inserted into an interface apparatus.

Figure 7A:
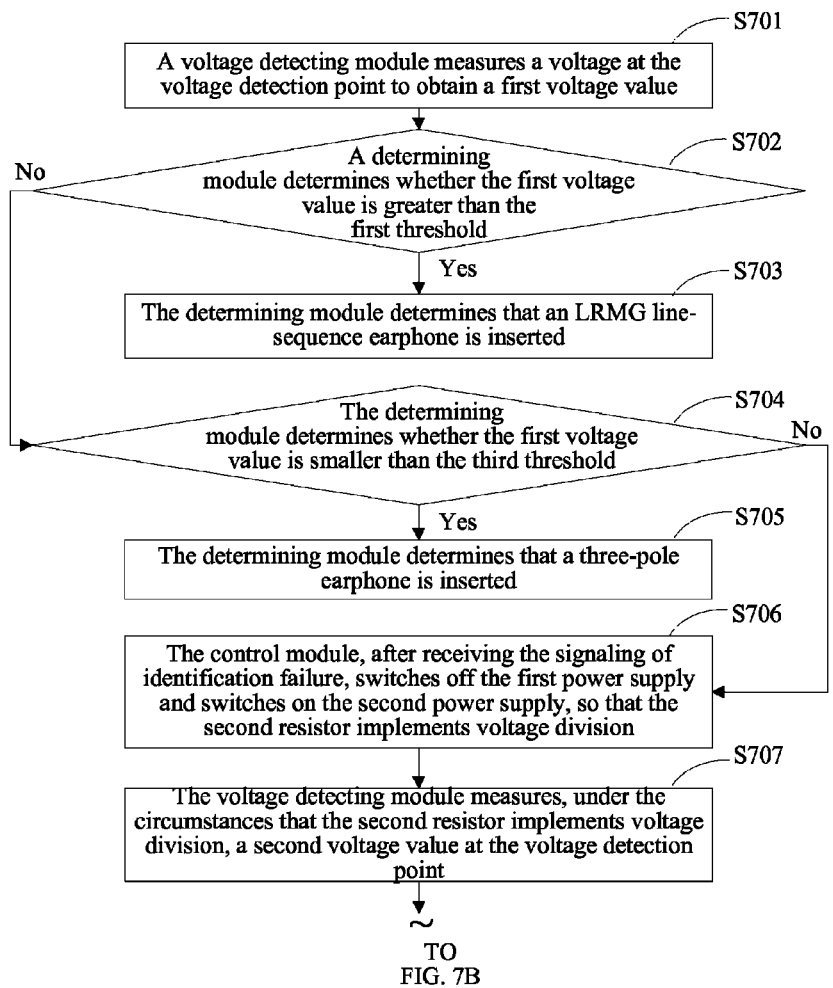
FIGS. 7A and 7B are an operating flowchart of an interface apparatus according to Embodiment 1 of the present invention.
Figure 7B:
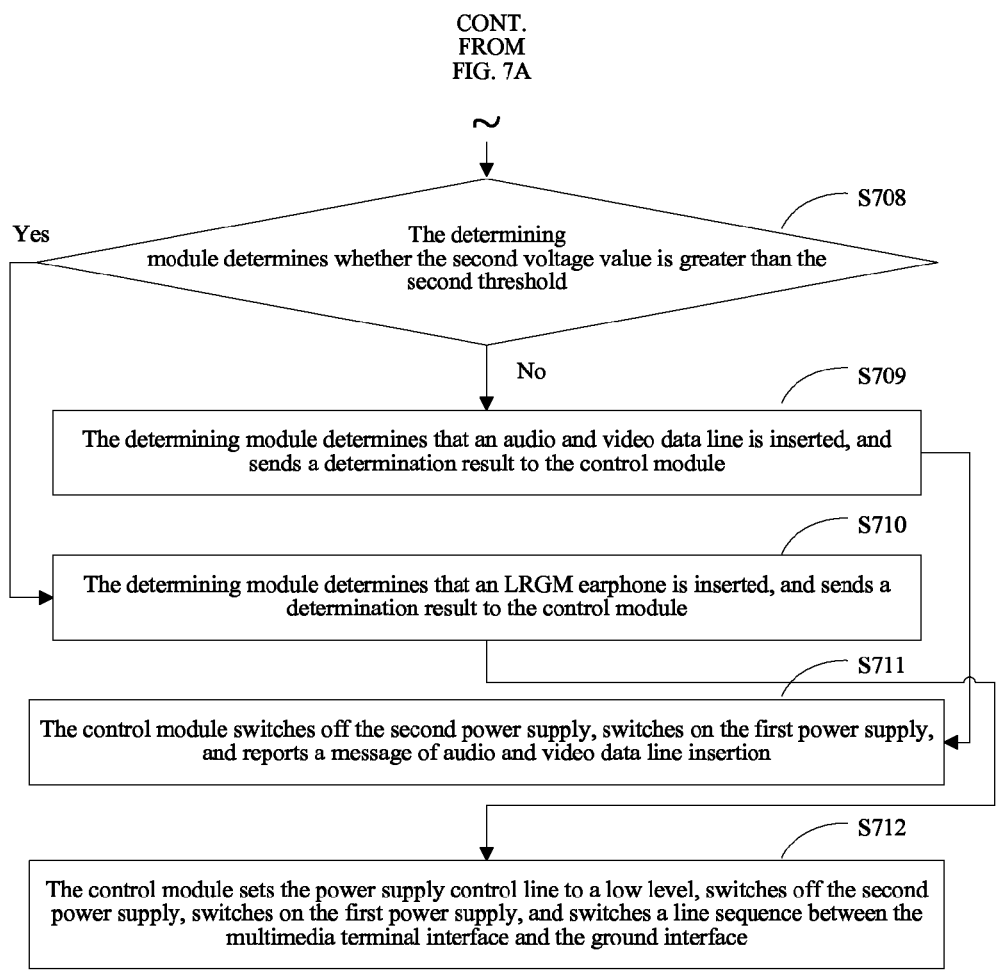

After the audio and video signal transmission line is inserted into the interface apparatus, the operation procedure of the interface apparatus is shown in FIGS. 7A and 7B, including the following operations:

S701. The voltage detecting module measures a voltage at the voltage detection point to obtain a first voltage value. Then, S702 is performed.

S702. The determining module determines whether the first voltage value is greater than the first threshold; if the first voltage value is greater than the first threshold, S703 is performed; otherwise, S704 is performed.

S703. The determining module determines that an LRMG line-sequence earphone is inserted.

Based on a determination result in S703, because the line sequence thereof is consistent with the interface line sequence of the interface apparatus, audio and video signals may be transmitted without any processing by the interface apparatus.

S704. The determining module determines whether the first voltage value is smaller than the third threshold; if the first voltage value is smaller than the third threshold, S705 is performed; otherwise, the determining module sends an unidentifiable signal to the control module, and the S706 is performed.

S705. The determining module determines that a three-pole earphone is inserted.

A determination result in S705 is a three-pole earphone. Because the three-pole earphone whose line sequence matches the interface line sequence of the interface apparatus, the three-pole earphone is compatible with the interface apparatus.

S706. The control module, after receiving the unidentifiable signal, switches off the first power supply and switches on the second power supply, so that the second resistor performs voltage division; and then S707 is performed.

S707. The voltage detecting module measures, under the circumstances that the second resistor performs voltage division, a second voltage value at the voltage detection point; and then S708 is performed.

S708. The determining module compares the second voltage value with the second threshold; if the second voltage value is smaller than or equal to the second threshold, S709 is performed; otherwise, S710 is performed.

S709. The determining module determines that an audio and video data line is inserted, and sends a determination result to the control module; and then S711 is performed.

S710. The determining module determines that an LRGM earphone is inserted, and sends a determination result to the control module; and then S712 is performed.

S711. The control module switches off the second power supply, switches on the first power supply, and reports a message about that the audio and video data line is inserted, so that the device side outputs audio and video signals according to the message.

Because a video loop in the audio and video data line is multiplexed, which is capable of transmitting audio signals as well as video signals, after it is identified that the audio and video data line is inserted, the audio and video data line is compatible with the device side where the interface apparatus is located.

The device side specifically determines to output audio signals or video signals, which is not within the scope of the present invention.

Figure 8:
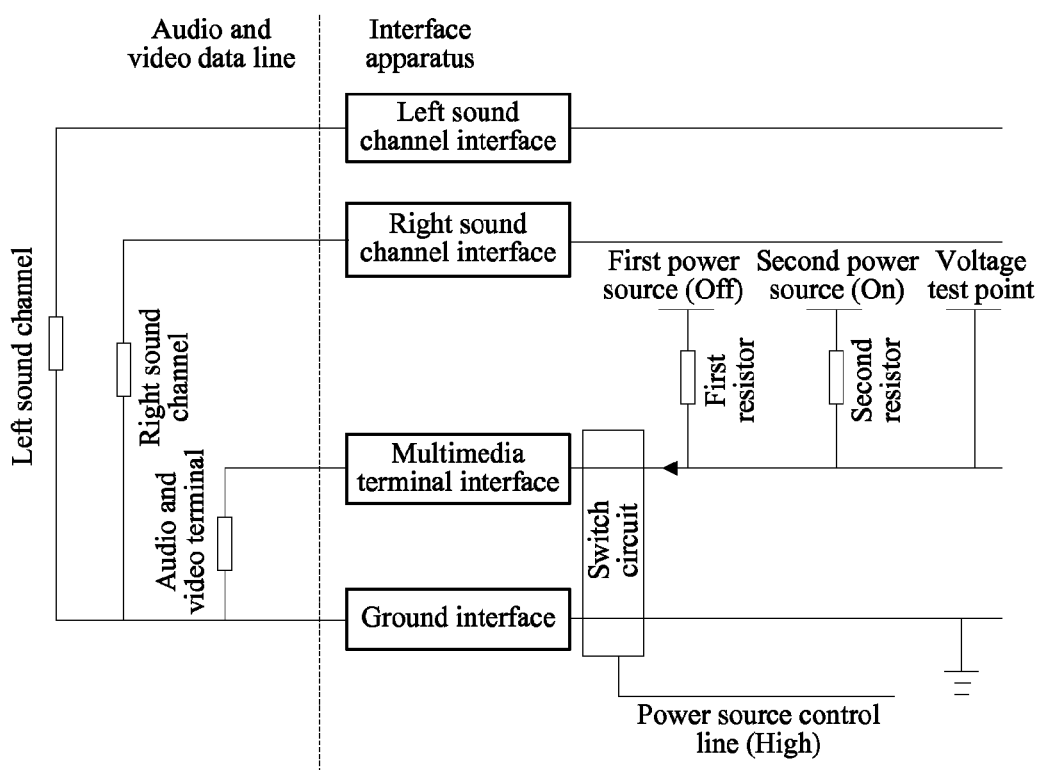
FIG. 8 is a schematic circuit diagram of an LRGM line-sequence earphone inserted into an interface apparatus experiencing compatibility processing according to Embodiment 1 of the present invention.

S712. The control module switches off the second power supply, switches on the first power supply, and switches the line sequence between the multimedia terminal interface and the ground interface by controlling the power control line to output a low level. A schematic circuit diagram thereof is shown in FIG. 8.

It should be noted that in the above procedure, the sequence of determining the thresholds is merely an example instead of a limit Persons skilled in the art may also perform threshold determination according to other sequences without creative efforts.

The above is the procedure by using an LRMG line-sequence interface apparatus as an example. When the line sequence of the interface apparatus is LRVG, because the video loop is capable of transmitting both audio signals and video signals, when an LRMG line-sequence earphone is inserted, it is also compatible and the procedure thereof is the same as the above.

The interface apparatus provided in the embodiments of the present invention is capable of identifying different types of audio and video data transmission lines by using the above operations, thereby implementing compatibility between a device and different types of audio and video data transmission lines.

Embodiment 2

Figure 9:
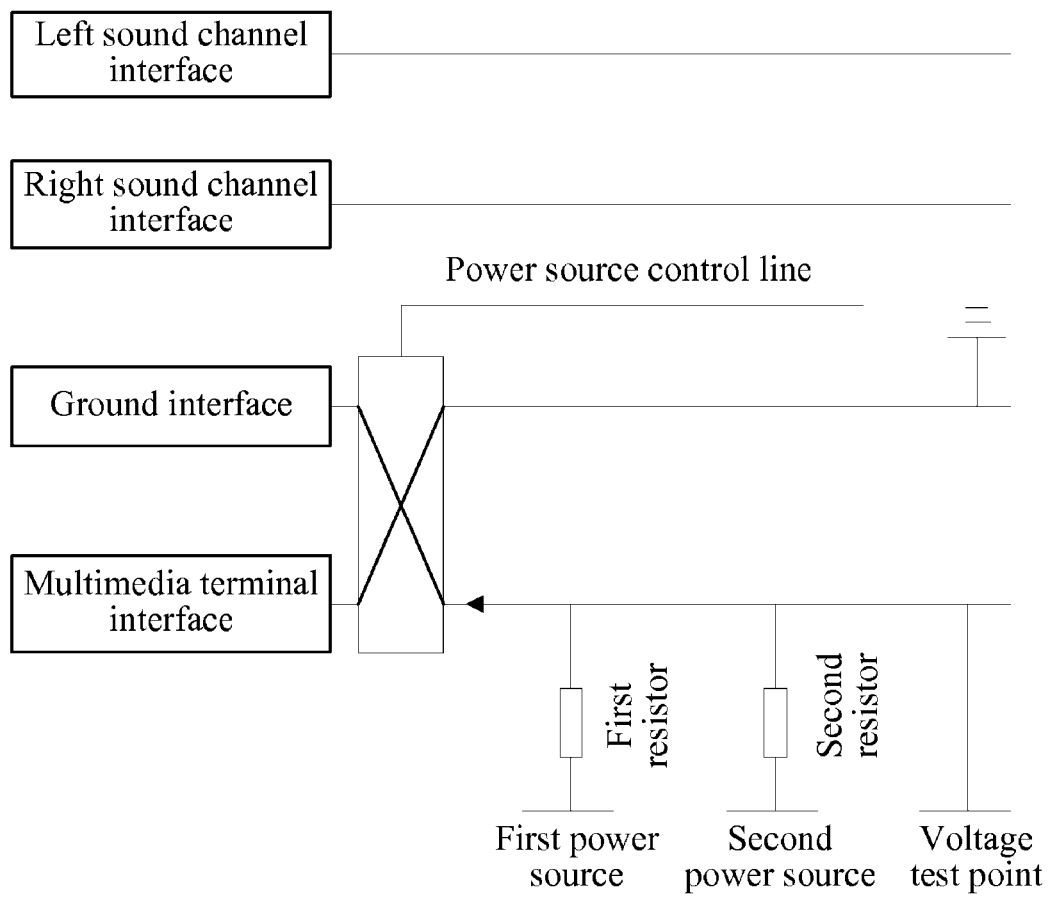
FIG. 9 is a schematic circuit diagram of an interface apparatus according to Embodiment 2 of the present invention.

In Embodiment 2, as shown by the schematic circuit diagram of an audio and video signal transmission interface apparatus in FIG. 9, a line sequence of the interface apparatus is left sound channel interface—right sound channel interface—ground interface—multimedia terminal interface (which may specifically be an LRGM line sequence). A second power supply and a second resistor are provided at a voltage detection point on a circuit of the multimedia terminal interface. By default, the second power supply is off, the first power supply is on, and a power supply control line outputs a low level.

Because in the interface apparatus provided in Embodiment 2 of the present invention, the power supply control line outputs the low level, the line sequence of the ground interface and the multimedia terminal interface is switched. As shown in FIG. 9, the actual line sequence after switching is LRMG. Therefore, after an audio and video signal transmission line is inserted into the interface apparatus, reference may be made to the procedure in the above embodiment 1. The difference lies only in that:

In S712, the operation of Embodiment 2 of the present invention is that, the control module switches off the second power supply, switches on the first power supply, and switches the line sequence between the multimedia terminal interface and the ground interface by controlling the power supply control line to output a high level, thereby switching the interface line sequence of the interface apparatus to LRGM.

Embodiment 3

Figure 10:
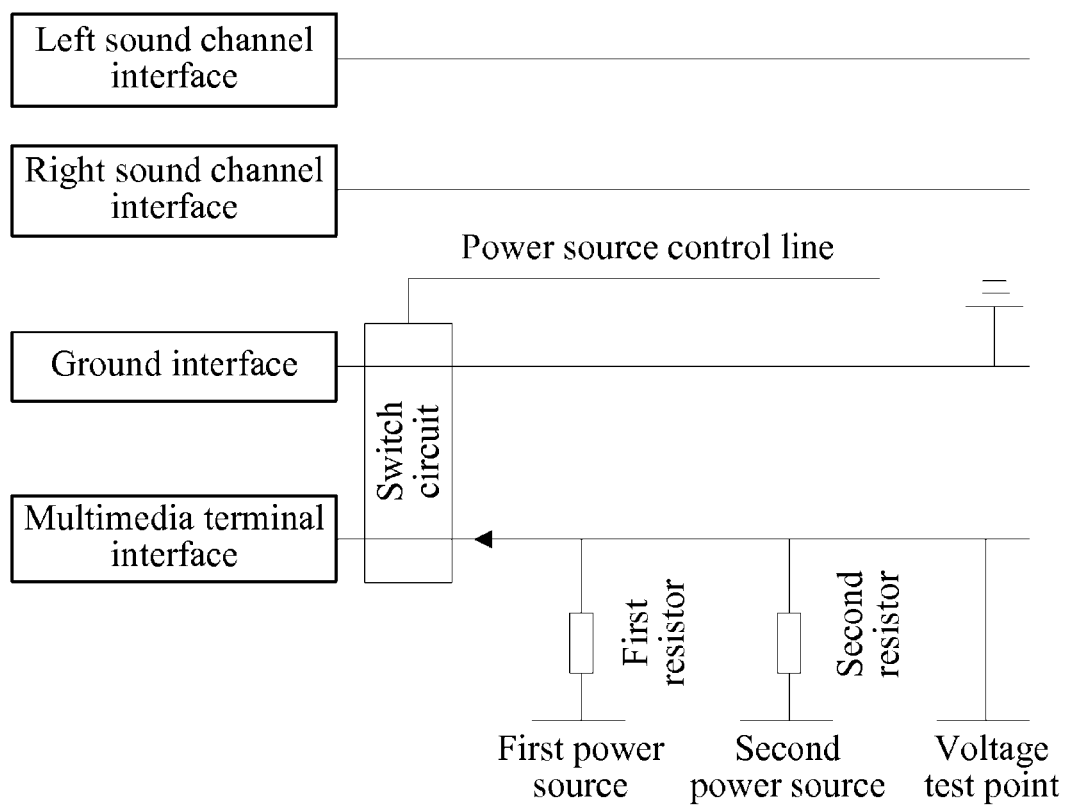
FIG. 10 is a schematic circuit diagram of an interface apparatus according to Embodiment 3 of the present invention.

In Embodiment 3, as shown by the schematic circuit diagram of an audio and video signal transmission interface apparatus in FIG. 10, a line sequence of the interface apparatus is left sound channel interface—right sound channel interface—ground interface—multimedia terminal interface (which may specifically be an LRGM line sequence). A second power supply and a second resistor are provided at a voltage detection point on a circuit of the multimedia terminal interface. By default, the second power supply is off, the first power supply is on, and a power supply control line outputs a high level.

Figure 11:
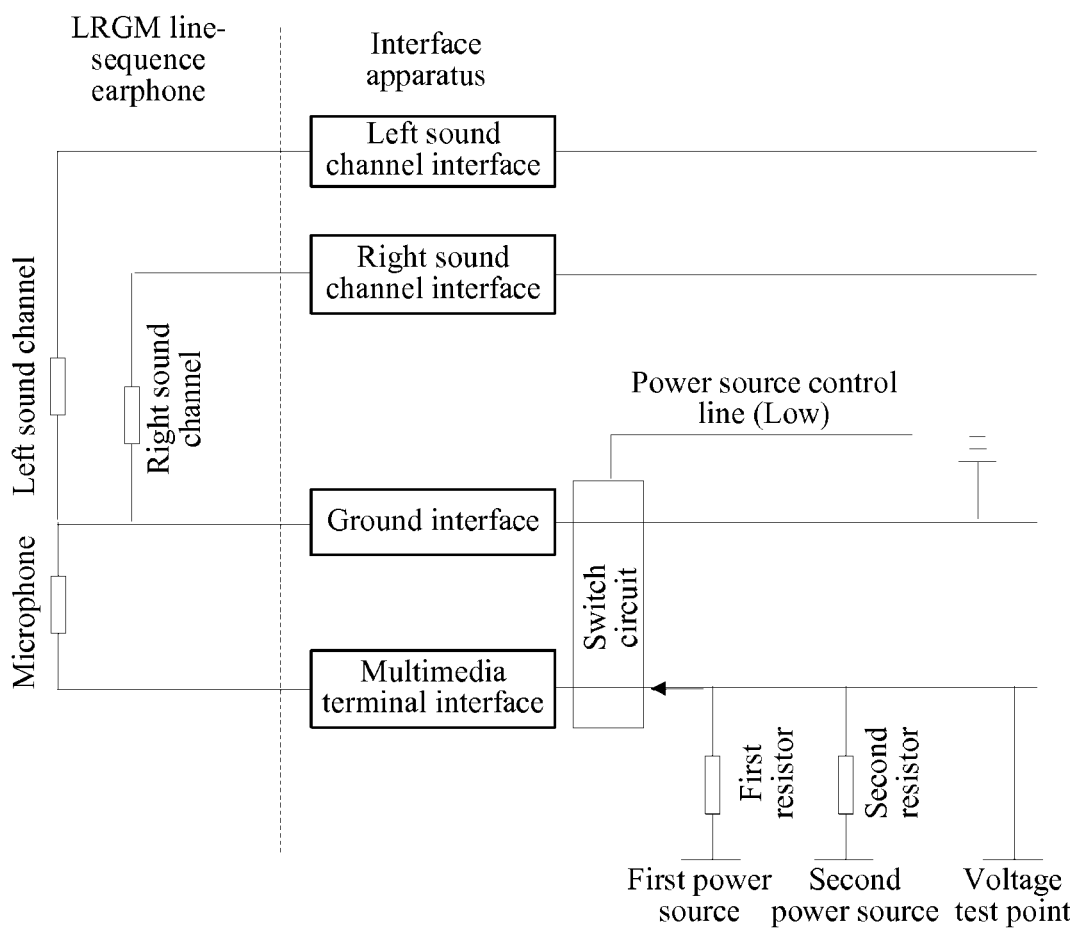
FIG. 11 is a schematic circuit diagram of an LRGM line-sequence earphone inserted into an interface apparatus according to Embodiment 3 of the present invention.
Figure 12:
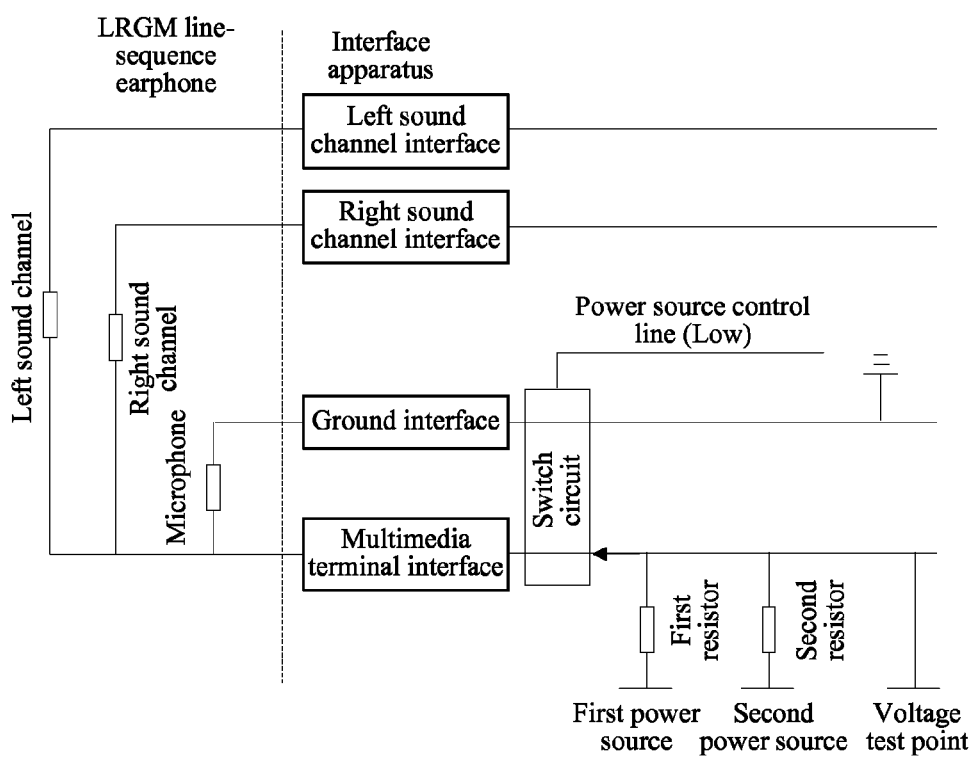
FIG. 12 is a schematic circuit diagram of an LRMG line-sequence earphone inserted into an interface apparatus according to Embodiment 3 of the present invention.
Figure 13:
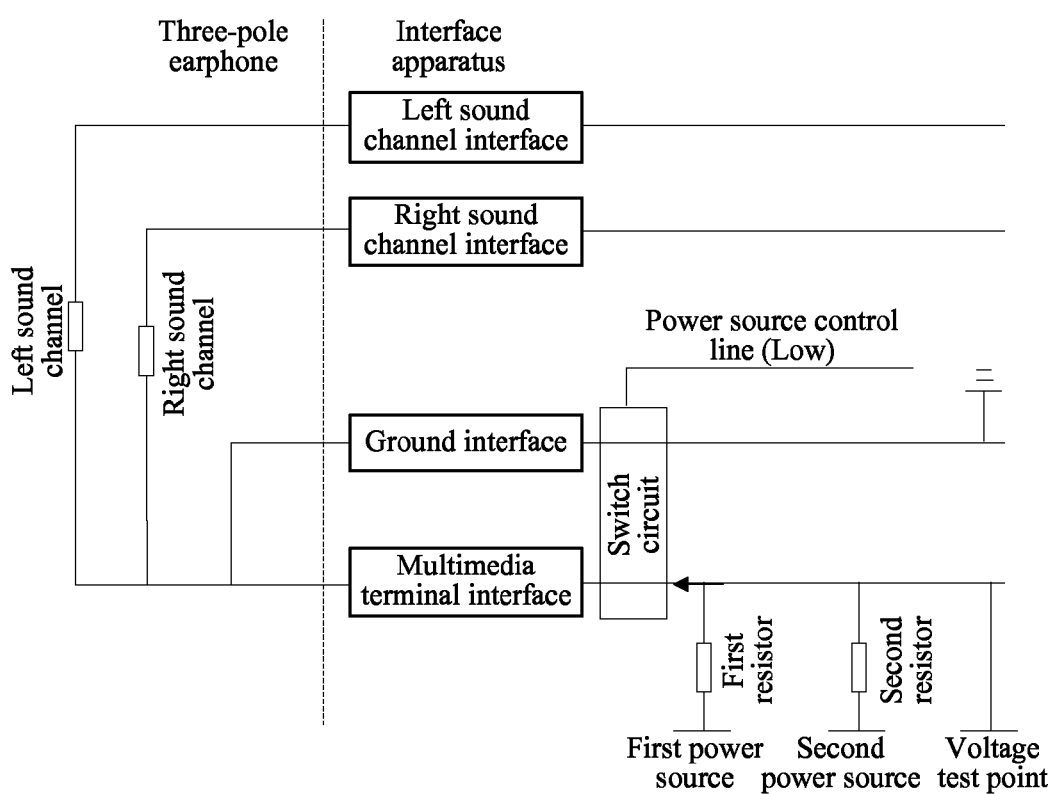
FIG. 13 is a schematic circuit diagram of a three-pole earphone inserted into an interface apparatus according to Embodiment 3 of the present invention.
Figure 14:
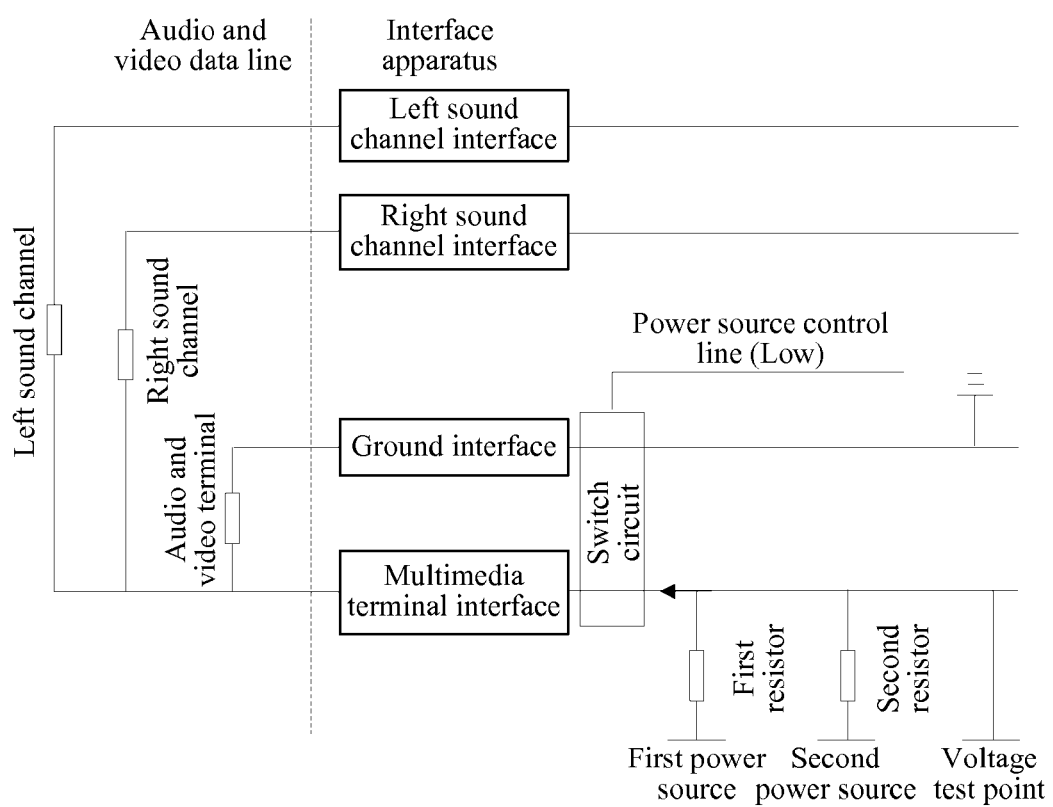
FIG. 14 is a schematic circuit diagram of an audio and video data line inserted into an interface apparatus according to Embodiment 3 of the present invention.

A voltage value on the transmission line side is detected by using the voltage detection point provided on the circuit of the multimedia terminal, thereby identifying different types of transmission lines and making them compatible. Schematic circuit diagrams of different types of audio and video data transmission lines inserted into the interface apparatus are shown in FIG. 11 to FIG. 14. FIG. 11 is a schematic circuit diagram of an LRGM line-sequence earphone inserted into the interface apparatus. FIG. 12 is a schematic circuit diagram of an LRMG line-sequence earphone inserted into the interface apparatus. FIG. 13 is a schematic circuit diagram of a three-pole earphone inserted into the interface apparatus. FIG. 14 is a schematic circuit diagram of an audio and video data line inserted into an interface apparatus.

Figure 15A:
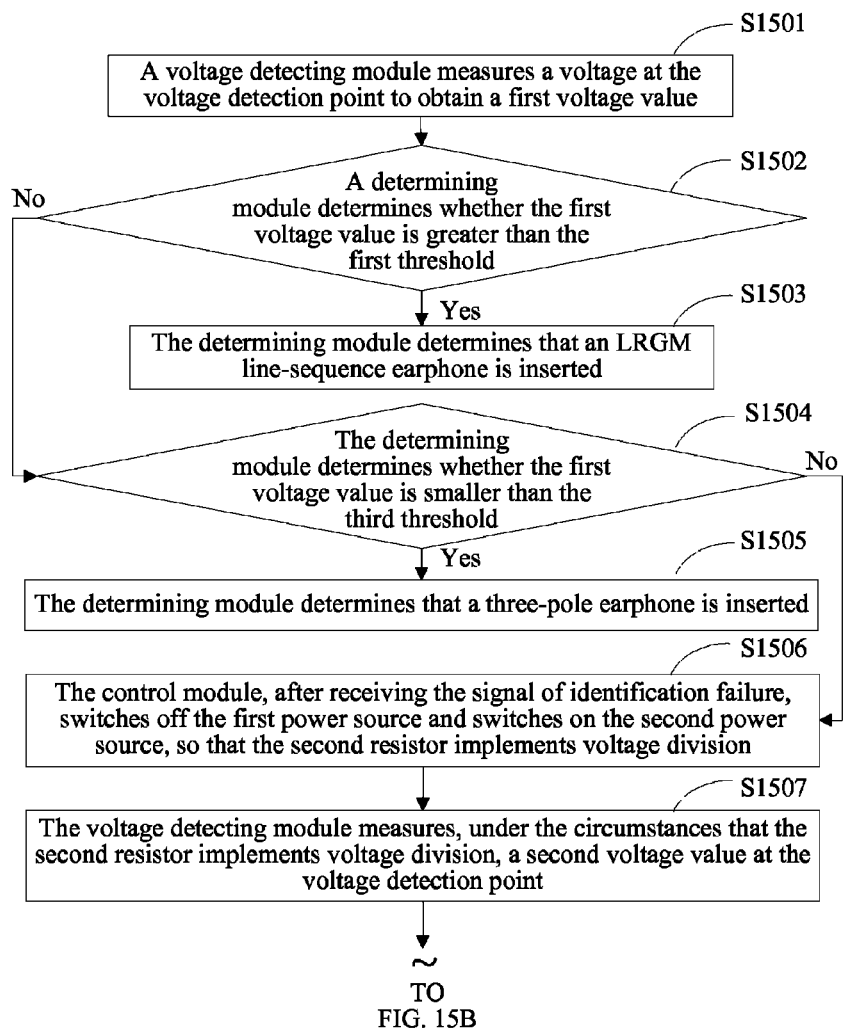
FIGS. 15A and 15B are an operating flowchart of an interface apparatus according to an embodiment 3 of the present invention.
Figure 15B:
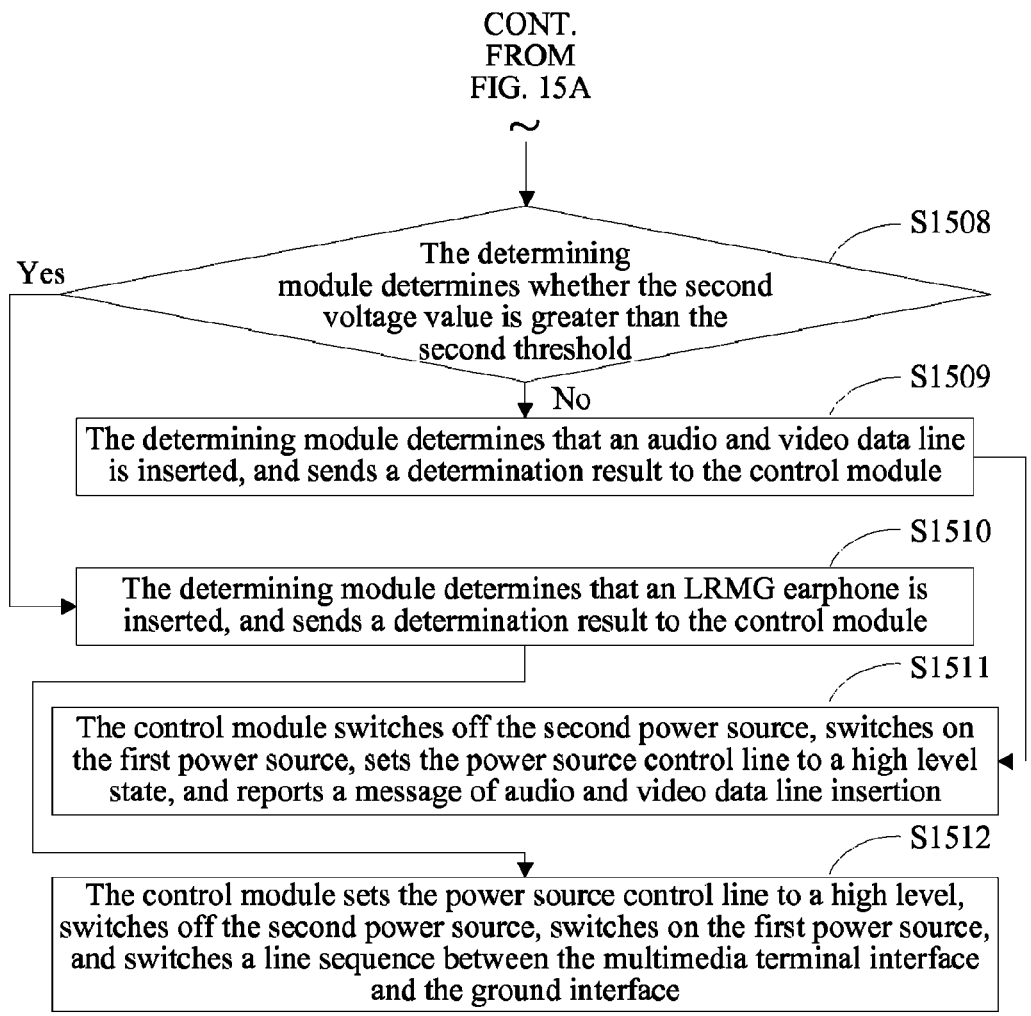

After the audio and video signal transmission line is inserted into the interface apparatus, the operation procedure of the interface apparatus is shown in FIGS. 15A and 15B, including the following operations:

S1501. The voltage detecting module measures a voltage at the voltage detection point to obtain a first voltage value. Then, S1502 is performed.

S1502. The determining module determines whether the first voltage value is greater than the first threshold; if the first voltage value is greater than the first threshold, S1503 is performed; otherwise, S1504 is performed.

S1503. The determining module determines that an LRGM line-sequence earphone is inserted.

Based on a determination result in S1503, because the line sequence thereof is consistent with the interface line sequence of the interface apparatus, audio and video signals may be transmitted without any processing by the interface apparatus.

S1504. The determining module determines whether the first voltage value is smaller than the third threshold; if the first voltage value is smaller than the third threshold, S1505 is performed; otherwise, the determining module sends an unidentifiable signal to the control module, and the S1506 is performed.

S1505. The determining module determines that a three-pole earphone is inserted.

A determination result in S1505 is a three-pole earphone. Because the three-pole earphone whose line sequence matches the interface line sequence of the interface apparatus, the three-pole earphone is compatible with the interface apparatus.

S1506. The control module, after receiving the unidentifiable signal, switches off the first power supply and switches on the second power supply, so that the second resistor performs voltage division; and then S1507 is performed.

S1507. The voltage detecting module measures, under the circumstances that the second resistor performs voltage division, a second voltage value at the voltage detection point; and then S1508 is performed.

S1508. The determining module compares the second voltage value with the second threshold; if the second voltage value is smaller than or equal to the second threshold, S1509 is performed; otherwise, S1510 is performed.

S1509. In a multimedia terminal loop formed after the audio and video data line is inserted into an LRGM line-sequence interface apparatus, a resistance value of the audio and video terminal is still 75 ohms Therefore, the determining module determines that an audio and video data line is inserted, and sends a determination result to the control module; and then S1511 is performed.

S1510. The determining module determines that an LRMG earphone is inserted, and sends a determination result to the control module; and then S1512 is performed.

S1511. The control module switches off the second power supply, switches on the first power supply, switch the line sequence between the multimedia terminal interface and the ground interface by controlling the power supply control line to output a low level, thereby establishing a video path, and reports a message about that the audio and video data line is inserted, so that the device side outputs audio and video signals according to the message.

A video loop in the audio and video data line is multiplexed, which is capable of transmitting audio signals as well as video signals. Therefore, after it is identified that the audio and video data line is inserted, as long as the power supply control line is controlled to output a low level, the audio and video data line may be compatible with the device side where the LRGM line-sequence interface apparatus is located. The device side specifically determines to output audio signals or video signals, which is not within the scope of the present invention.

Figure 16:
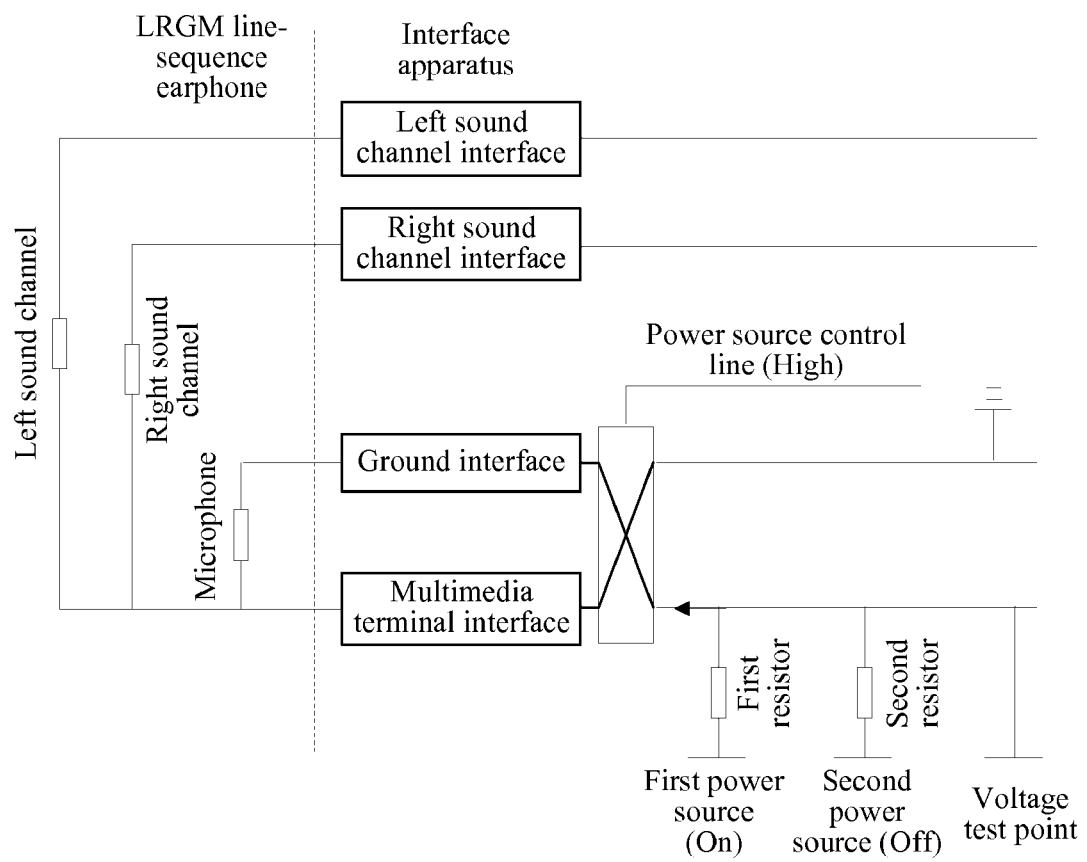
FIG. 16 is a schematic circuit diagram of an LRMG line-sequence earphone inserted into an interface apparatus experiencing compatibility processing according to Embodiment 3 of the present invention.

S1512. The control module switches off the second power supply, switches on the first power supply, and switches the line sequence between the multimedia terminal interface and the ground interface by controlling the power control line to output a low level. A schematic circuit diagram thereof is shown in FIG. 16.

The interface apparatus provided in the embodiments of the present invention is capable of identifying different types of audio and video data transmission lines by using the above operations, thereby implementing compatibility between a device and different types of audio and video data transmission lines.

Embodiment 4

Figure 17:
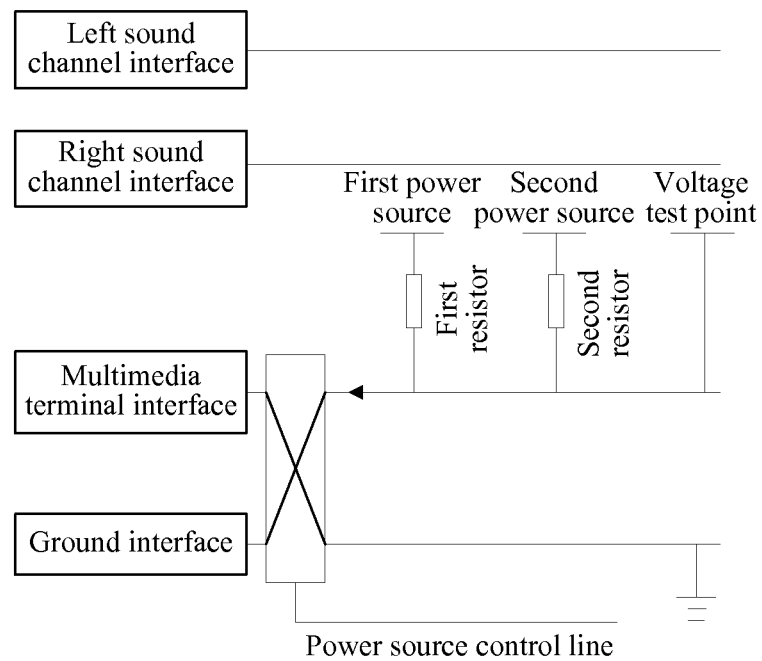
FIG. 17 is a schematic circuit diagram of an interface apparatus according to Embodiment 4 of the present invention.

In Embodiment 4, as shown by the schematic circuit diagram of an audio and video signal transmission interface apparatus in FIG. 17, a line sequence of the interface apparatus is left sound channel interface—right sound channel interface—multimedia terminal interface—ground interface. A second power supply and a second resistor are provided at a voltage detection point on a circuit of the multimedia terminal interface. By default, the second power supply is off, the first power supply is on, and a power supply control line outputs a low level.

Because in the interface apparatus provided in Embodiment 4 of the present invention, the power supply control line outputs the low level, the line sequence of the ground interface and the multimedia terminal interface is switched. As shown in FIG. 17, the actual line sequence after switching is LRGM. Therefore, after an audio and video signal transmission line is inserted into the interface apparatus, reference may be made to the procedure in Embodiment 3. The difference lies only in that:

In S1511, the operation of Embodiment 4 of the present invention is that, the control module switches off the second power supply, switches on the first power supply, switches the line sequence between the multimedia terminal interface and the ground interface by controlling the power supply control line to output a high level (so that the interface line sequence of the interface apparatus is switched to left sound channel interface-right sound channel interface-multimedia terminal interface—ground interface), and reports a message about that the audio and video data line is inserted, so that the device side outputs audio and video signals according to the message; and In S1512, the operation of Embodiment 4 of the present invention is that, the control module switches off the second power supply, switches on the first power supply, and switches the line sequence between the multimedia terminal interface and the ground interface by controlling the power supply control line to output a high level, thereby switching the interface line sequence of the interface apparatus to left sound channel interface-right sound channel interface-multimedia terminal interface—ground interface.

All or a part of the steps of the foregoing methods in the embodiments may be implemented by a program instructing relevant hardware. The foregoing program may be stored in a computer readable storage medium. When the program is run, the steps of the foregoing methods in the embodiments are performed. The storage medium may include: any medium that can store program codes, such as a ROM, a RAM, a magnetic disk, or an optical disk.

The foregoing descriptions are merely specific exemplary embodiments of the present invention, but are not intended to limit the protection scope of the present invention. Any variation or replacement readily figured out by persons skilled in the art within the technical scope disclosed in the present invention shall fall within the protection scope of the present invention. Therefore, the protection scope of the present invention shall be subject to the protection scope claimed by the claims.

What is claimed is:

1. An audio and video signal transmission interface apparatus, comprising a left sound channel interface, a right sound channel interface, a multimedia terminal interface, and a ground interface; wherein a voltage detection point is set in a circuit of the multimedia terminal interface, and a first power supply is connected to the voltage detection point through a first resistor; wherein, the apparatus further comprises a voltage detecting module, a determining module, a control module, and a second resistor of which one end is connected to the voltage detection point and of which the other end is connected to a power supply; wherein the voltage detecting module is configured to detect a voltage value at the voltage detection point of a multimedia terminal of an audio and video signal transmission line that is inserted, wherein the multimedia terminal of the audio and video signal transmission line comprises an audio and video terminal or a microphone terminal, and a resistance value of the second resistor is greater than an internal resistance value of the audio and video terminal and is smaller than an internal resistance value of the microphone terminal in reverse connection;

the determining module is configured to determine a type of the audio and video signal transmission line according to a detecting result of the voltage detecting module; and the control module is configured to perform processing according to a determination result of the determining module.

2. The apparatus according to claim 1, wherein the first resistor and the second resistor are connected in parallel, and the power supply connected to the second resistor is the first power supply.

3. The apparatus according to claim 1, wherein the power supply connected to the second resistor is a second power supply; the second power supply may be switched off to switch off the second resistor; the second power supply may be switched on to switch on the second resistor; the first power supply may be switched on to switch on the first resistor; and the first power supply may be switched off to switch off the first resistor.

4. The apparatus according to claim 1, wherein a resistance value of the first resistor ranges from 1500 to 3000 ohms, and the resistance value of the second resistor ranges from 150 to 350 ohms.

5. The apparatus according to claim 1, wherein the apparatus further comprises an analog switch that is controlled by a power supply control line and located between the multimedia terminal interface and the ground interface, and the power supply line controls the analog switch by switching an output level to switch a line sequence between the multimedia terminal interface and the ground interface.

6. The apparatus according to claim 2, wherein the apparatus further comprises an analog switch that is controlled by a power supply control line and located between the multimedia terminal interface and the ground interface, and the power supply line controls the analog switch by switching an output level to switch a line sequence between the multimedia terminal interface and the ground interface.

7. The apparatus according to claim 3, wherein the apparatus further comprises an analog switch that is controlled by a power supply control line and located between the multimedia terminal interface and the ground interface, and the power supply line controls the analog switch by switching an output level to switch a line sequence between the multimedia terminal interface and the ground interface.

8. A method for processing, by the interface apparatus according to claim 1, an inserted audio and video signal transmission line, comprising:

after an audio and video signal transmission line is inserted into the interface apparatus, measuring, by the voltage detecting module, when the first resistor is on and the second resistor is off, a first voltage value of a multimedia terminal in the audio and video signal transmission line;

determining, by the determining module, whether the first voltage value is greater than a first threshold or smaller than a third threshold; if first voltage value is greater than the first threshold or smaller than the third threshold, determining that the audio and video signal transmission line is an earphone matching an interface line sequence of the apparatus; if first voltage value is not greater than the first threshold or smaller than the third threshold, triggering the control module to operate, wherein the first threshold is greater than the third threshold;

switching off, by the control module, the first resistor; switching on the second resistor; and triggering the voltage detecting module to re-measure a voltage; wherein the voltage detecting module also measures a second voltage value of the multimedia terminal in the audio and video signal transmission line according to the triggering by the control module;

further comparing, by the determining module, the second voltage value and a second threshold; if the second voltage value is smaller than or equal to the second threshold, determining that the audio and video signal transmission line is an audio and video data line; otherwise, determining that the audio and video signal transmission line is an earphone that does not match the interface sequence of the apparatus; and sending a determination result to the control module, wherein the second threshold is smaller than the first threshold and greater than the third threshold;

if the audio and video signal transmission line is the audio and video data line, further switching off, by the control module, the second resistor, switching on the first resistor, and reporting a message about that the audio and video data line is inserted; and if the audio and video signal transmission line is the earphone that does not match the interface line sequence of the apparatus, further switching off, by the control module, the second resistor, switching on the first resistor, and switching a line sequence of the multimedia terminal interface and the ground interface.

9. The method according to claim 8, wherein a value range of the third threshold is smaller than 0.3 V.

10. The method according to claim 8, wherein an interface line sequence of the interface apparatus is left sound channel interface—right sound channel interface—ground interface—multimedia terminal interface; and after an audio and video data line is detected, the method further comprises:

switching, by the control module, a line sequence of the multimedia terminal interface and the ground interface.

11. The method according to claim 9, wherein an interface line sequence of the interface apparatus is left sound channel interface—right sound channel interface—ground interface—multimedia terminal interface; and after an audio and video data line is detected, the method further comprises:

switching, by the control module, a line sequence of the multimedia terminal interface and the ground interface.

12. The method according to claim 8, wherein the switching the line sequence between the multimedia terminal interface and the ground interface comprises:

switching the line sequence between the multimedia terminal interface and the ground interface by controlling an analog switch provided between the multimedia terminal interface and the ground interface.

13. The method according to claim 9, wherein the switching the line sequence between the multimedia terminal interface and the ground interface comprises:
   switching the line sequence between the multimedia terminal interface and the ground interface by controlling an analog switch provided between the multimedia terminal interface and the ground interface.

\* \* \* \* \*